United States Patent
Ko

(10) Patent No.: US 12,438,162 B2
(45) Date of Patent: Oct. 7, 2025

(54) SEPARATOR UNIT FOR A FUEL CELL AND A UNIT CELL FOR A FUEL CELL INCLUDING SAME

(71) Applicants: HYUNDAI MOTOR COMPANY, Seoul (KR); KIA CORPORATION, Seoul (KR)

(72) Inventor: Han Gil Ko, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 619 days.

(21) Appl. No.: 17/875,006

(22) Filed: Jul. 27, 2022

(65) Prior Publication Data

US 2023/0197981 A1 Jun. 22, 2023

(30) Foreign Application Priority Data

Dec. 22, 2021 (KR) ........................ 10-2021-0185245

(51) Int. Cl.
*H01M 8/0273* (2016.01)
*H01M 8/0267* (2016.01)
*H01M 8/1004* (2016.01)

(52) U.S. Cl.
CPC ....... *H01M 8/0273* (2013.01); *H01M 8/0267* (2013.01); *H01M 8/1004* (2013.01)

(58) Field of Classification Search
CPC .......................... H01M 8/0273; H01M 8/0267
See application file for complete search history.

(56) References Cited

U.S. PATENT DOCUMENTS

| | | | |
|---|---|---|---|
| 7,790,305 B2 | 9/2010 | Heystek et al. | |
| 2008/0199761 A1 | 8/2008 | Heystek et al. | |
| 2009/0239120 A1* | 9/2009 | Moteki | H01M 8/026 |
| | | | 429/492 |

FOREIGN PATENT DOCUMENTS

| | | |
|---|---|---|
| JP | 2008192338 A | 8/2008 |
| JP | 5206665 B2 | 6/2013 |
| JP | 5338512 B2 | 11/2013 |
| JP | 5482991 B2 | 5/2014 |
| WO | 2008114567 A1 | 9/2008 |

* cited by examiner

*Primary Examiner* — Olatunji A Godo
(74) *Attorney, Agent, or Firm* — Lempia Summerfield Katz LLC

(57) ABSTRACT

A unit cell for a fuel cell includes an electricity-generating assembly (EGA) in which a gas diffusion layer (GDL) is laminated on each of both sides of a membrane electrode assembly (MEA). The unit cell has a first separator and a second separator disposed on an outside of the EGA and a reaction surface is formed on each of the first and second separators through which a reactive gas flows. A cooling surface is formed on each of the first and second separators opposite the reaction surfaces and through which cooling water flows. A reaction surface gasket is formed on the reaction surface of the first separator, wrapping and fixing a top and bottom of the EGA, and forming an airtight line with the second separator. A cooling surface gasket is formed on the cooling surface of the first separator and forms an airtight line with a second separator of another unit cell disposed adjacent to the unit cell.

16 Claims, 10 Drawing Sheets

-PRIOR ART-

-PRIOR ART-

-PRIOR ART-

-PRIOR ART-

-PRIOR ART-

SEPARATOR UNIT FOR A FUEL CELL AND A UNIT CELL FOR A FUEL CELL INCLUDING SAME

CROSS REFERENCE TO RELATED APPLICATION

The present application claims priority to Korean Patent Application No. 10-2021-0185245, filed Dec. 22, 2021, the entire contents of which are incorporated herein for all purposes by this reference.

BACKGROUND

Field of the Disclosure

The present disclosure relates to a separator unit for a fuel cell and a unit cell for a fuel cell including the same. More particularly, the present disclosure relates to a separator unit for a fuel cell and a unit cell for a fuel cell including the same, which can improve airtight stability by changing the shape of a gasket to a clip structure.

Description of the Related Art

A fuel cell is a type of power generation device that converts chemical energy of a fuel into electrical energy through an electrochemical reaction in a stack. Fuel cells can be used not only to supply electric power for industrial and household use and driving power for vehicles, but also to power small electronic products such as portable devices. Recently, the area of use of fuel cells as a high efficiency clean energy source has been gradually expanded.

FIG. 1 is a view showing the configuration of a typical fuel cell stack.

As can be seen in FIG. 1, in a unit cell of a typical fuel cell stack, a membrane electrode assembly (MEA) 10 is located at the innermost side. The membrane electrode assembly 10 is composed of a polymer electrolyte membrane 11 capable of moving hydrogen cations (protons) and a catalyst layer coated on both sides of the electrolyte membrane so that hydrogen and oxygen can react, i.e., a fuel electrode anode 12 and an air electrode cathode 13.

In addition, a pair of gas diffusion layers 20 (GDL) are stacked on the outer portion of the membrane electrode assembly 10, i.e., on the outer portion where the fuel electrode 12 and the air electrode 13 are located. A separator assembly 30 having a flow field formed therein to supply fuel and discharge water generated by the reaction is positioned outside the gas diffusion layer 20 with a gasket line 40 interposed therebetween.

Here, the separator assembly 30 is formed by bonding an anode separator 31 disposed on the anode and a cathode separator 32 disposed on the cathode while the anode separator 31 and the cathode separator 32 face each other.

Meanwhile, a fuel cell stack is formed by stacking a plurality of unit cells, and an end plate 50 for supporting and fixing each of the above-described components is coupled to the outermost side of the stacked unit cells.

Here, the anode separator 31 disposed in any one unit cell is stacked so as to face the cathode separator 32 of another unit cell disposed adjacent to the formerly mentioned unit cell.

Accordingly, the separator assembly 30, in which the cathode separator 32 and the anode separator 31 of adjacent unit cells disposed to face each other are integrated, is used to construct a unit cell in order to smoothly perform the stacking process of the unit cells and maintain the alignment of the unit cells.

Here, the anode separator 31 and the cathode separator 32 of the separator assembly 30 are bonded and integrated, so that manifolds communicate with each other, and each reaction region is configured in a similar shape to be disposed at the same position.

Meanwhile, in the separator assembly 30, the plurality of manifolds and the reaction regions are spaces in which reactive gas or cooling water is introduced, discharged, or flows, and an airtight line is formed by the gasket 40 along the circumference of the plurality of manifolds and the reaction regions for airtightness.

In general, the airtight line is formed by injecting a rubber gasket 40 to a predetermined thickness on the surface of at least one of the anode separator 31 and the cathode separator 32.

For example, recently, the gasket 40 is not formed on the anode separator 31 but is formed in various forms on a cathode reaction surface and a cathode cooling surface of the cathode separator 32 for the convenience of the process.

FIG. 2A is a view showing an anode separator of a typical fuel cell stack. FIG. 2B is a view showing a cathode reaction surface of a cathode separator of a typical fuel cell stack. FIG. 2C is a view showing a cathode cooling surface of a cathode separator of a typical fuel cell stack.

An anode separator of a typical fuel cell stack as shown in FIG. 2A has an anode reaction region 1a in which a flow field through which hydrogen flows is formed in the central region. The anode separator also has a plurality of manifolds 1b formed on both sides of the anode reaction region 1a. Here, six manifolds 1b are provided, and hydrogen, air, or cooling water is introduced or discharged through each manifold.

In particular, a hydrogen flow channel 31a is for introducing hydrogen flowing through a hydrogen intake manifold 1b' into the anode reaction region 1a. The hydrogen flow channel 31a is formed between the hydrogen intake manifold 1b', through which hydrogen is introduced among the plurality of manifolds 1b formed on the anode separator 31, and the anode reaction region 1a.

Here, a plurality of hydrogen flow channels 31a are formed so as to protrude from the anode separator 31 and penetrate in the direction of the anode reaction surface. In addition, a plurality of support protrusions 31b formed to protrude from the anode separator 31 in the direction of the anode reaction surface may be formed at points spaced apart from each of the hydrogen flow channels 31a by a predetermined distance. Thus, when the fuel cell stack is stacked, the frame (hereinafter referred to as "sub gasket 14") surrounding and supporting the membrane electrode assembly 10 is brought into contact with the plurality of hydrogen flow channels 31a and support protrusions 31b that are formed by protruding from the anode separator 31. The frame may be supported.

In this way, the sub gasket 14 is stacked between the anode separator 31 and the cathode separator 32 to constitute a unit cell.

In addition, a gasket forming an airtight line is not formed on the anode separator 31.

Meanwhile, the cathode separator 32 of the typical fuel cell stack as shown in FIGS. 2B and 2C also has an cathode reaction region 2a in which a flow field is formed in the central region. Air flows through the flow field. A plurality of manifolds 2b are formed on both sides of the cathode reaction region 2a. Here, six manifolds 2b are also provided, and hydrogen, air, or cooling water is introduced or discharged through each manifold.

In particular, an air flow channel 32a is for introducing air flowing through an air intake manifold 2b' into the cathode reaction region 2a. The air flow channel 32a is formed between the air intake manifold 2b', through which air is introduced among the plurality of manifolds 2b formed on the cathode separator 32, and the cathode reaction region 2a.

Meanwhile, various types of gasket lines 40a are formed in the cathode separator 32 to maintain airtightness while forming a flow path through which hydrogen, air, or cooling water flows.

For example, as shown in FIG. 2B, on the cathode reaction surface of the cathode separator 32, an outer airtight line 41 contacting the anode separator 31 while surrounding the plurality of manifolds 2b and the cathode reaction region 2a is formed. Then, an inner airtight line 42 contacting the sub gasket 14 while surrounding the cathode reaction region 2a and securing a path through which air is introduced is formed. A separator in which the outer airtight line 41 contacting the anode separator 31 and the inner airtight line 42 contacting the sub gasket 14 are formed together on the cathode reaction surface of the cathode separator 32 is typically referred to as a "dual gasket type separator".

In addition, as shown in FIG. 2C, on the cathode cooling surface of the cathode separator 32, an airtight line 40b is formed. The airtight line 40b contacts the anode separator 31 while securing a path through which cooling water flows and a path through which air flows.

Meanwhile, FIG. 3 is a view showing a unit cell of a typical fuel cell stack.

As shown in FIG. 3, in the unit cell of the typical fuel cell stack, an electricity-generating assembly (EGA) 21 is disposed between the anode reaction surface of the anode separator 31 and the cathode reaction surface of the cathode separator 32. The EGA is an assembly in which the membrane electrode assembly 10 and the gas diffusion layer 20 are stacked on both sides thereof. Here, the electricity-generating assembly 21 may further include a sub gasket 14 that surrounds and supports the edge of the membrane electrode assembly 10. Thus, each side of the electricity-generating assembly 21 is disposed in the anode reaction region 1a of the anode separator 31 and in the cathode reaction region 2a of the cathode separator 32, respectively.

Here, the cathode cooling surface of the cathode separator 32 is stacked so as to be opposed to the anode cooling surface of the anode separator 31 of the adjacent unit cell.

Meanwhile, generally in the case of a unit cell of a fuel cell stack to which a dual gasket type separator is applied, a portion in which the sub gasket 14 of the electricity-generating assembly 21 is in contact with the anode separator or the cathode separator without the gasket 40 is inevitably created.

FIG. 4 is a view showing the stacked state of the unit cells along the line A-A of FIG. 2B. As can be seen in FIG. 4, there is no gasket in the portion S1 where the anode separator 31 and the sub gasket 14 of the electricity-generating assembly 21 contact each other. Thus, airtightness is not guaranteed.

Further, in the portion S2 where the cathode separator 31 and the sub gasket 14 of the electricity-generating assembly 21 contact each other, the sub gasket 14 is easily bent and airtightness is reduced in the corresponding portion. This is because, even if there is a gasket forming the inner airtight line 42, the portion created is in contact with only one surface of the sub gasket 14 of the electricity-generating assembly 21 and the sub gasket 14 is thin and made of a flexible material.

Meanwhile, in the case of a dual gasket type separator, there is a problem that the separator occupies a lot of space in the separator since the gasket 40 responsible for internal and external airtightness is dually configured on the reaction surface of the cathode separator 32.

The foregoing is intended merely to aid in the understanding of the background of the present disclosure. The foregoing is not intended to mean that the present disclosure falls within the purview of the related art that is already known to those having ordinary skill in the art.

SUMMARY

Accordingly, the present disclosure has been made keeping in mind the above problems occurring in the related art. The present disclosure is intended to provide a separator unit for a fuel cell and a unit cell for a fuel cell including the same. The separate unit and the unit cell can improve airtight stability by changing the shape of a gasket to a clip structure.

The present disclosure is not limited to the above-mentioned objective. Other different objectives not mentioned herein should be clearly understood by those having ordinary skill in the art from the description of the present disclosure.

In order to achieve the above objectives, according to an embodiment of the present disclosure, a separator unit for a fuel cell, which is a separator unit used in a unit cell of a fuel cell, is provided. The separator unit includes a first separator having a reaction surface on a first side thereof. On the reaction surface, an electricity-generating assembly (EGA) is disposed and in which a gas diffusion layer (GDL) is laminated on each of both sides of a membrane electrode assembly (MEA). A cooling surface is formed on a second side of the first separator. The separator unit also includes a reaction surface gasket formed on the reaction surface of the first separator, wrapping and fixing a top and bottom of the EGA at a side of the EGA, and forming an airtight line with a second separator of the unit cell.

The reaction surface gasket may be divided into: an adhesive portion provided by being adhered to the reaction surface of the first separator; a hinge portion extended in a direction protruding from the adhesive portion; and a close contact portion bent and extended from an end of the hinge portion. An insertion space may be formed by the reaction surface gasket and in which the side of the EGA is inserted by being surrounded by the adhesive portion, the hinge portion, and the close contact portion.

At least one sealing protrusion, protruding in a direction opposite to the direction in which the hinge portion is formed, may be formed on the close contact portion.

The end of the close contact portion may be in a form of a fillet.

The reaction surface gasket may be formed of an elastic rubber material.

The separator unit may further include a cooling surface gasket formed on the cooling surface of the first separator. The cooling surface gasket forms an airtight line with a second separator of another unit cell disposed adjacent to the formerly mentioned unit cell.

The EGA may further include a sub gasket that surrounds and supports an edge of the MEA. The reaction surface gasket may wrap and fix the top and bottom of the sub gasket.

Meanwhile, a unit cell for a fuel cell according to an embodiment of the present disclosure is also provided. The unit cell includes an electricity-generating assembly (EGA) in which a gas diffusion layer (GDL) is laminated on each of both sides of a membrane electrode assembly (MEA). The unit cell also includes a first separator and a second separator disposed on an outside of the EGA. A reaction surface through which a reactive gas flows is formed on a surface of each of the first separator and the second separator, facing the GDL. A cooling surface through which cooling water flows is formed on a surface of each of the first separator and the second separator, opposite to the surface facing the GDL. The unit cell also includes a reaction surface gasket formed on the reaction surface of the first separator, wrapping and fixing a top and bottom of the EGA at a side of the EGA. The reaction surface gasket forms an airtight line with the second separator. The unit cell also includes a cooling surface gasket formed on the cooling surface of the first separator. The cooling surface forms an airtight line with a second separator of another unit cell disposed adjacent to the formerly mentioned unit cell.

The reaction surface gasket may be divided into: an adhesive portion provided by being adhered to the reaction surface of the first separator; a hinge portion extended in a direction protruding from the adhesive portion; and a close contact portion bent and extended from an end of the hinge portion and is in close contact with the reaction surface of the second separator. An insertion space may be formed by the reaction surface gasket and in which the side of the EGA is inserted by being surrounded by the adhesive portion, the hinge portion, and the close contact portion.

At least one sealing protrusion may be formed on the close contact portion, protruding in a direction opposite to the direction in which the hinge portion is formed, and is in close contact with the reaction surface of the second separator.

The end of the close contact portion may be in a form of a fillet.

An exposed area in which the GDL is not disposed may be formed at an edge of the EGA. The adhesive portion and the close contact portion may surround the exposed area of the EGA.

The EGA may further include a sub gasket that surrounds and supports an edge of the MEA. The reaction surface gasket may wrap and fix the top and bottom of the sub gasket.

When the EGA and the second separator and the first separator are fastened, a height of the hinge portion may correspond to a stacked height of the MEA and the sub gasket.

When the EGA and the second separator and the first separator are fastened, the reaction surface gasket may be formed of an elastic rubber material. As the hinge portion is elastically deformed, the sub gasket may be clamped by the adhesive portion and the close contact portion.

A gasket for airtightness may not be formed on the reaction surface and the cooling surface of the second separator.

The first separator may be a cathode separator and the second separator may be an anode separator.

According to embodiments of the present disclosure, the following effects can be expected.

First, unlike the conventional dual gasket type separator, the overall size of the separator can be reduced or the area of the reaction area can be increased by composing a single line of gaskets on the reaction surface of the cathode separator. Therefore, since the ratio of the reaction area to the total area of the fuel cell stack can be increased, the effects such as downsizing the fuel cell stack, reducing the cost of the separator, and increasing the energy efficiency can be expected.

Second, by using a reactive surface gasket that clamps the edge of the electricity-generating assembly (EGA) in the form of a clip, the degree of freedom of the location of the membrane electrode assembly (MEA) is reduced. Thus, the alignment of each component can be improved when the unit cells are stacked.

Third, since gaskets exist at all interfaces where other components come into contact, such as between the anode separator and the MEA, between the cathode separator and the MEA, and between the anode separator and the cathode separator, the airtightness of the unit cell can be guaranteed.

Fourth, since the gasket is injected only on the cathode separator and at the same time the gasket comprises a single line, less injection material is used compared to the dual gasket type separator. Thus, cost reduction can also be expected.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
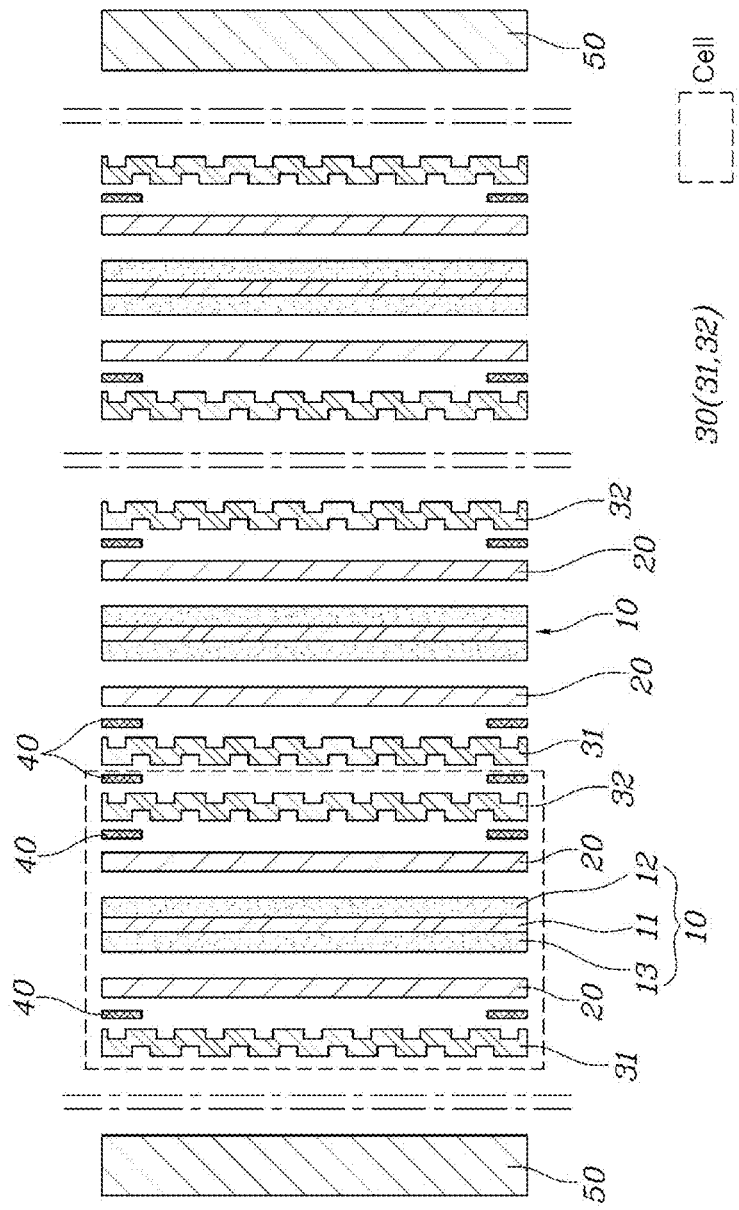
FIG. 1 is a view showing the configuration of a typical fuel cell stack.

Hereinafter, embodiments of the present disclosure are described in detail with reference to the accompanying drawings. However, the present disclosure is not limited to the embodiments disclosed below and may be implemented in various different forms. These embodiments are provided so that the present disclosure is complete, and to fully inform those of ordinary skill the scope of the inventive concept. In the drawings, the same reference numerals refer to the same or equivalent elements. When a component, device, element, or the like of the present disclosure is described as having a purpose or performing an operation, function, or the like, the component, device, or element should be considered herein as being "configured to" meet that purpose or to perform that operation or function.

Figure 3:
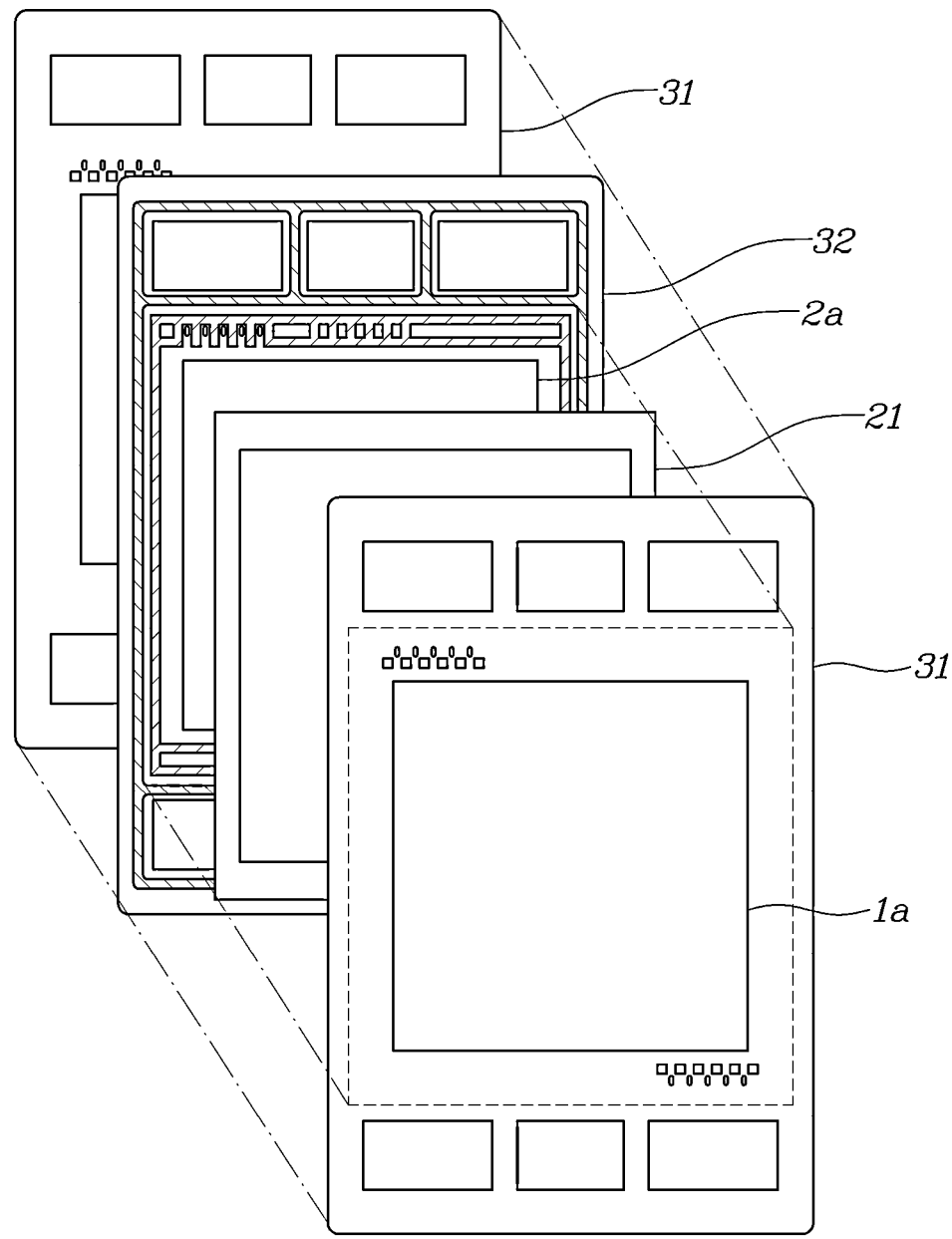
FIG. 3 is a view showing a unit cell of the typical fuel cell stack.
Figure 4:
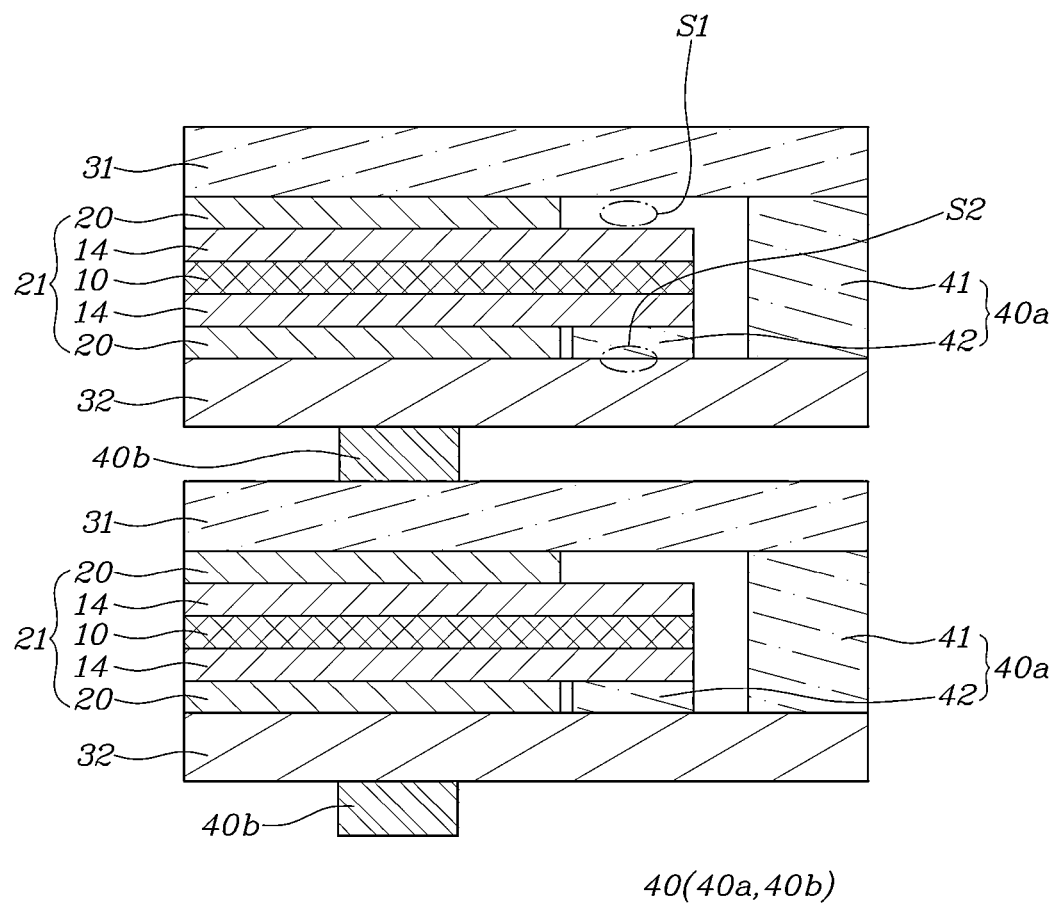
FIG. 4 is a view showing the stacked state of the unit cells along the line A-A of FIG. 2B.

A unit cell according to an embodiment of the present disclosure maintains the configuration of the unit cell of a typical fuel cell stack shown in FIGS. 1 and 3 as it is. The unit cell adjusts the formation position and shape of a gasket formed on a separator selected from a pair of separators to increase the airtight stability of the unit cell.

Figure 6A:
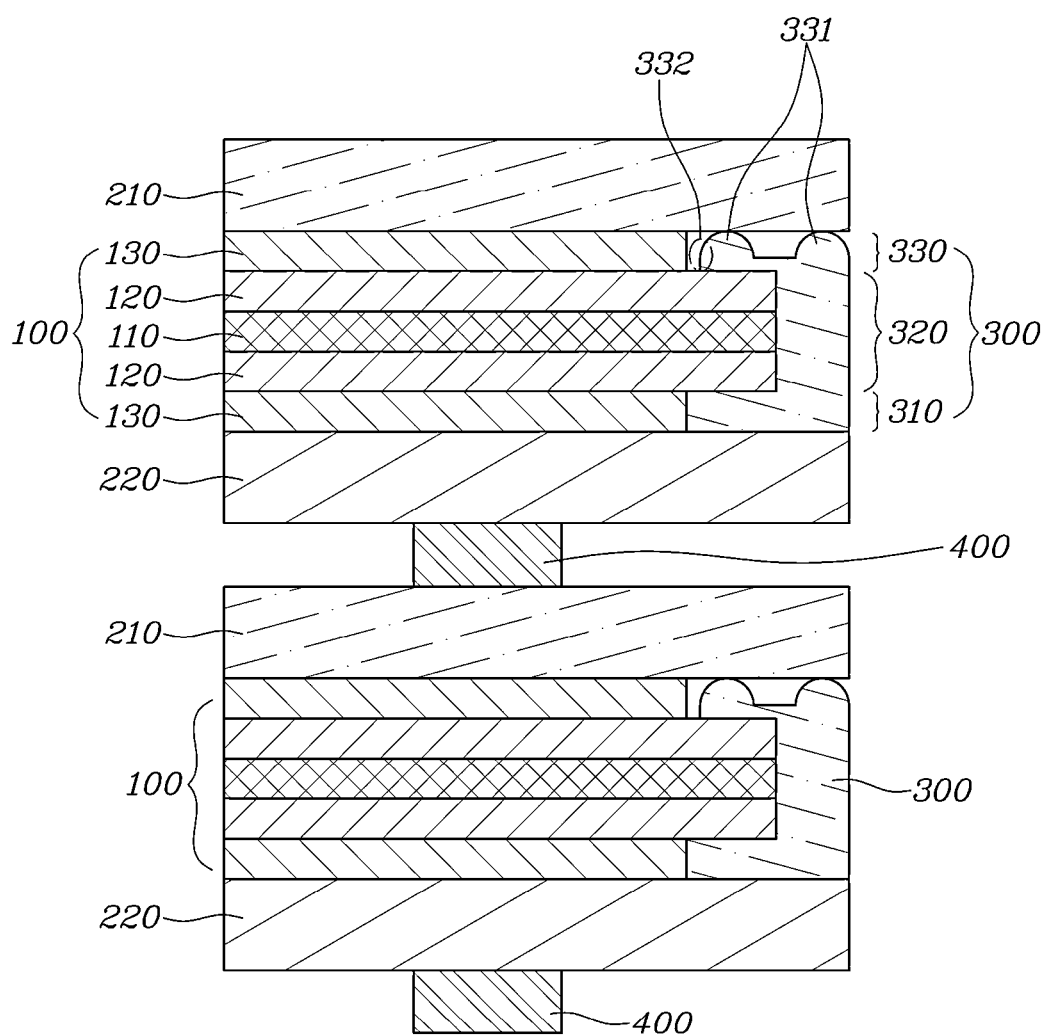
FIGS. 6A and 6B are views showing the stacked state of unit cells along the lines B-B and C-C of FIG. 5.
Figure 6B:
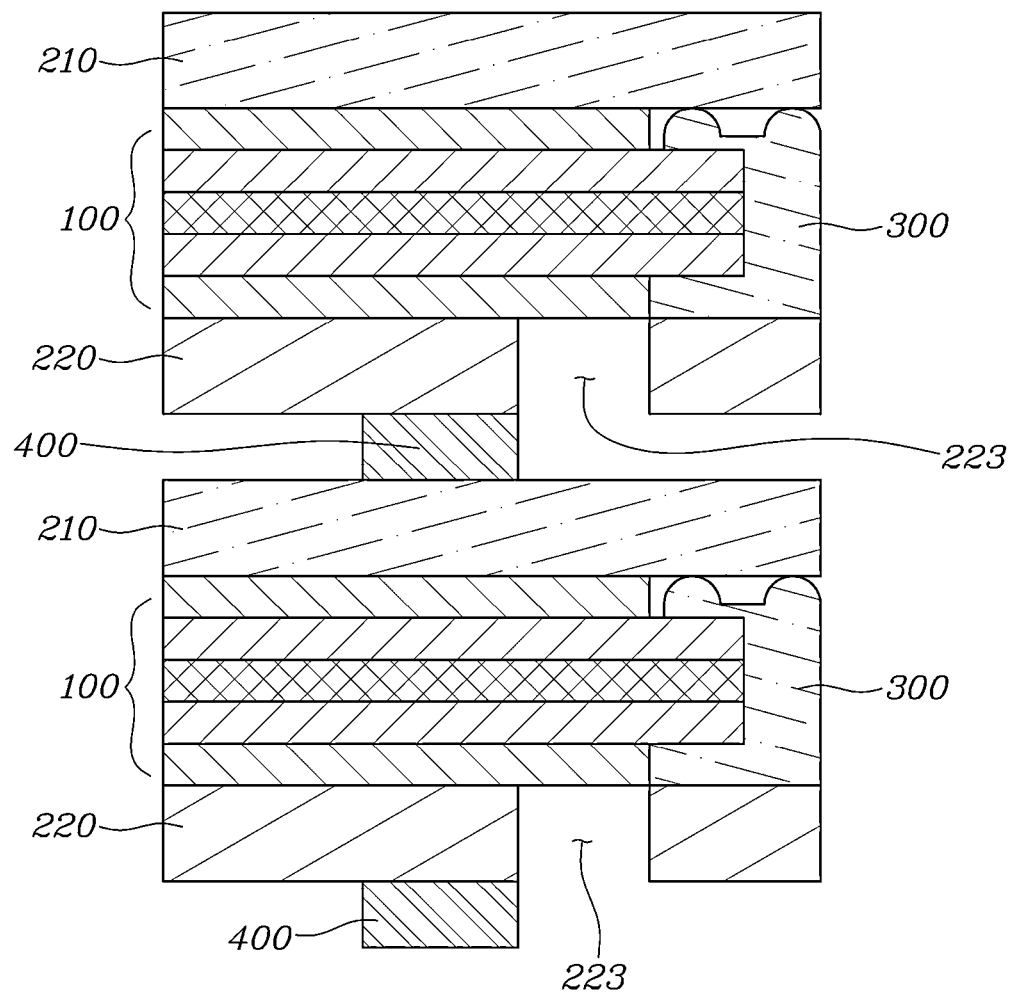

In the unit cell according to the embodiment of the present disclosure, as shown in FIGS. 6A and 6B, and like in the unit cell for a fuel cell, a membrane electrode assembly 110 and an electricity-generating assembly (EGA) 100 are disposed between a pair of separators 210 and 220. In the EGA 100, a gas diffusion layer 130 is laminated or disposed on each of both sides of the membrane electrode assembly 110. Here, the electricity-generating assembly 100 may further include a frame that surrounds and supports the edge of the membrane electrode assembly 110, and this frame is referred to as a sub gasket 120.

Here, the pair of separators 210 and 220 comprise a first separator and a second separator. The first separator is a cathode separator 220 and the second separator is an anode separator 210.

Thus, a reaction surface of the anode separator 210 and a reaction surface of the cathode separator 220 are disposed on each side of the electricity-generating assembly 100, respectively.

In particular, in the unit cell for a fuel cell according to the embodiment of the present disclosure, a reaction surface gasket 300 and a cooling surface gasket 400, which are described below, may be formed on one of the anode separator 210 and the cathode separator 220.

In the embodiment, the formation of the reaction surface gasket 300 and the cooling surface gasket 400 on the cathode separator 220 is described as an example.

To elaborate, the reaction surface gasket 300 is injected and formed on the reaction surface of the cathode separator 220. The cooling surface gasket 400 is injected and formed on the cooling surface of the cathode separator 220.

The reaction surface gasket 300 and the cooling surface gasket 400 are not limited to being formed on the cathode separator 220. The reaction surface gasket 300 and the cooling surface gasket 400 may be formed on the anode separator plate 210.

In addition, a plurality of unit cells are connected in series to constitute a fuel cell stack.

The anode separator 210 configured in one unit cell is disposed to face the cathode separator 220 configured in the unit cell adjacent thereto.

In the following description, a redundant description of the unit cell for a typical fuel cell stack has been omitted.

Figure 5:
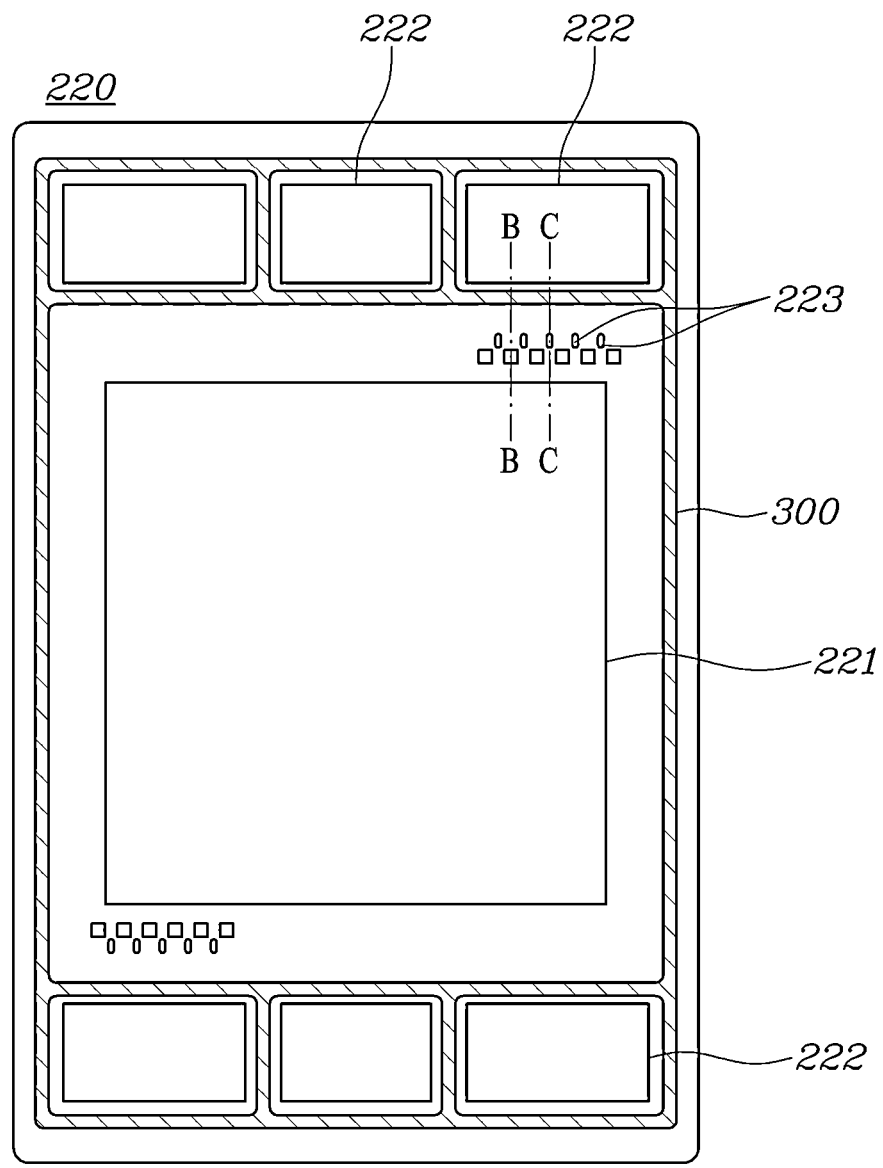
FIG. 5 is a view showing a separator unit for a fuel cell according to an embodiment of the present disclosure.
Figure 7A:
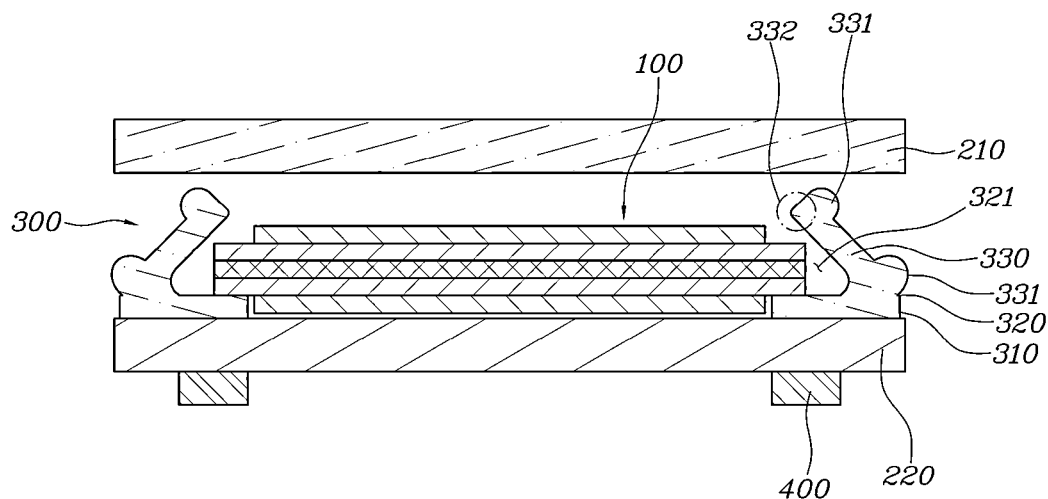
FIGS. 7A and 7B are views showing the structure of a reaction surface gasket before and after fastening of unit cells for a fuel cell according to an embodiment of the present disclosure.
Figure 7B:
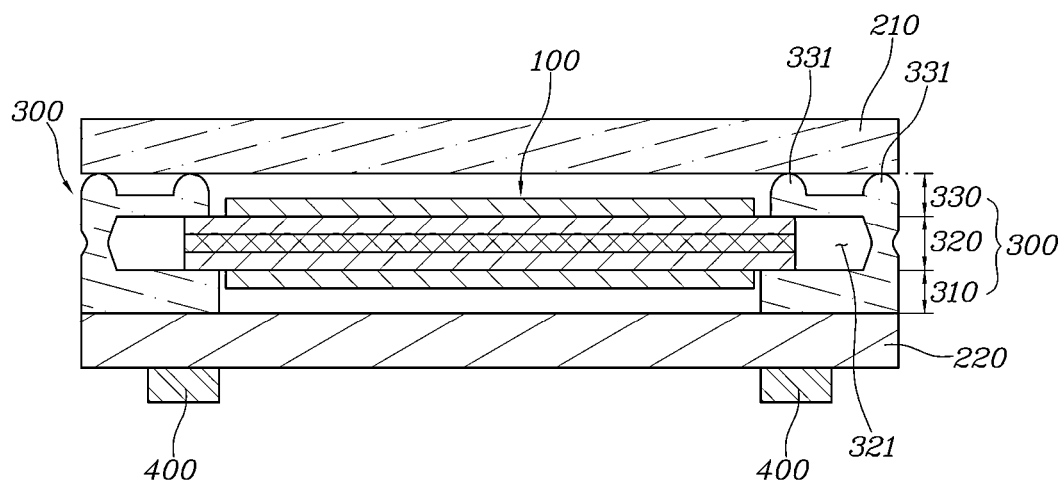

FIG. 5 is a view showing a separator unit for a fuel cell according to an embodiment of the present disclosure. FIGS. 6A and 6B are views showing a stacked state of unit cells along the lines B-B and C-C of FIG. 5. FIGS. 7A and 7B are views showing the structure of a reaction surface gasket before and after fastening of unit cells for a fuel cell according to an embodiment of the present disclosure.

Here, FIG. 6A is a view showing a stacked state of unit cells along the line B-B of FIG. 5. FIG. 6B is a view showing a stacked state of unit cells along the line C-C of FIG. 5. FIG. 7A is a view showing the structure of a reaction surface gasket before fastening of unit cells for a fuel cell according to an embodiment of the present disclosure. FIG. 7B is a view showing the structure of a reaction surface gasket after fastening of unit cells for a fuel cell according to the embodiment of the present disclosure.

A separator unit for a fuel cell according to an embodiment of the present disclosure refers to the cathode separator 220 of the unit cell. The reaction surface gasket 300 and the cooling surface gasket 400 are formed by injection on the reaction surface and the cooling surface of the cathode separator 220, respectively.

The unit cell for a fuel cell according to the embodiment of the present disclosure is configured to include the above-described separator unit.

To elaborate, the unit cell for a fuel cell according to the embodiment of the present disclosure includes: a membrane electrode assembly (MEA) 110; a sub gasket 120 that surrounds and supports the edge of the membrane electrode assembly 110; a electricity-generating assembly (EGA) 100 having a pair of gas diffusion layers (GDL) 130 disposed on both sides of the MEA 110; and an anode separator 210 and a cathode separator 220 disposed on the outside of the GDL 130. A reaction surface through which a reactive gas flows is formed on a surface of each of the anode separator 210 and the cathode separator 220, facing the GDL 130. A cooling surface through which cooling water flows is formed on a surface of each of the anode separator 210 and the cathode separator 220, opposite to the surface facing the GDL.

Also, the unit cell for a fuel cell according to the embodiment of the present disclosure further includes a reaction surface gasket 300 formed on the reaction surface of the cathode separator 220. The reaction surface gasket 300 wraps and fixes the top and bottom of the sub gasket 120 at the side of the sub gasket 120. The reaction surface gasket 300 forms an airtight line with the anode separator 210. The unit cell for the fuel cell further includes a cooling surface gasket 400 formed on the cooling surface of the cathode separator 220. The cooling surface gasket 400 forms an airtight line with the anode separator 210 of another unit cell disposed adjacent to the formerly mentioned unit cell.

Here, the membrane electrode assembly 110, the sub gasket 120, the gas diffusion layer 130, the anode separator 210, and the cathode separator 220 maintain the configuration of the membrane electrode assembly 110, the sub gasket 120, the gas diffusion layer 130, the anode separator 210, and the cathode separator 220 of the fuel cell stack shown in FIGS. 1 and 3 as it is.

However, changes are made to the arrangement and shape of the gasket that is injected and formed on the cathode separator 220.

To elaborate, the cathode separator 220 has a reaction region 221. In the reaction region 221, a flow field through which air flows is formed in the central region, and a plurality of manifolds 222 are formed on both sides of the reaction region 221. Here, any one of the plurality of manifolds 222 is an air intake manifold 222 through which air is introduced.

A plurality of air flow channels 130 protrude and penetrate in the reaction surface direction so that the air introduced through the air intake manifold 222 passes from the cooling surface of the cathode separator 220 to the reaction surface and flows to the reaction area 221. The plurality of air flow channels 130 are formed in the cathode separator 220 between the air intake manifold 222 and the reaction region 221.

In addition, the reaction surface gasket 300 is formed on the reaction surface of the cathode separator 220 to form an airtight line contacting the anode separator 210 while surrounding the plurality of manifolds 222 and the reaction region 22.

Figure 2A:
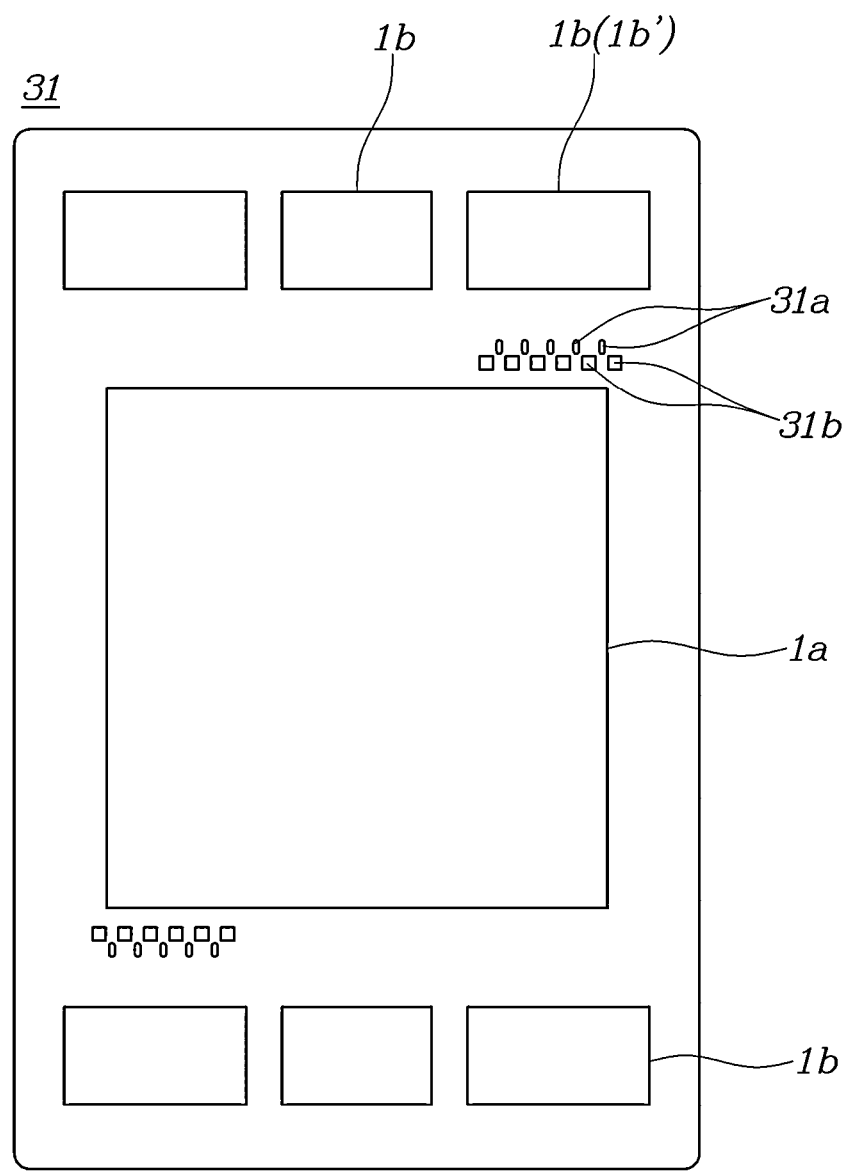
FIG. 2A is a view showing an anode separator of the typical fuel cell stack.
Figure 2B:
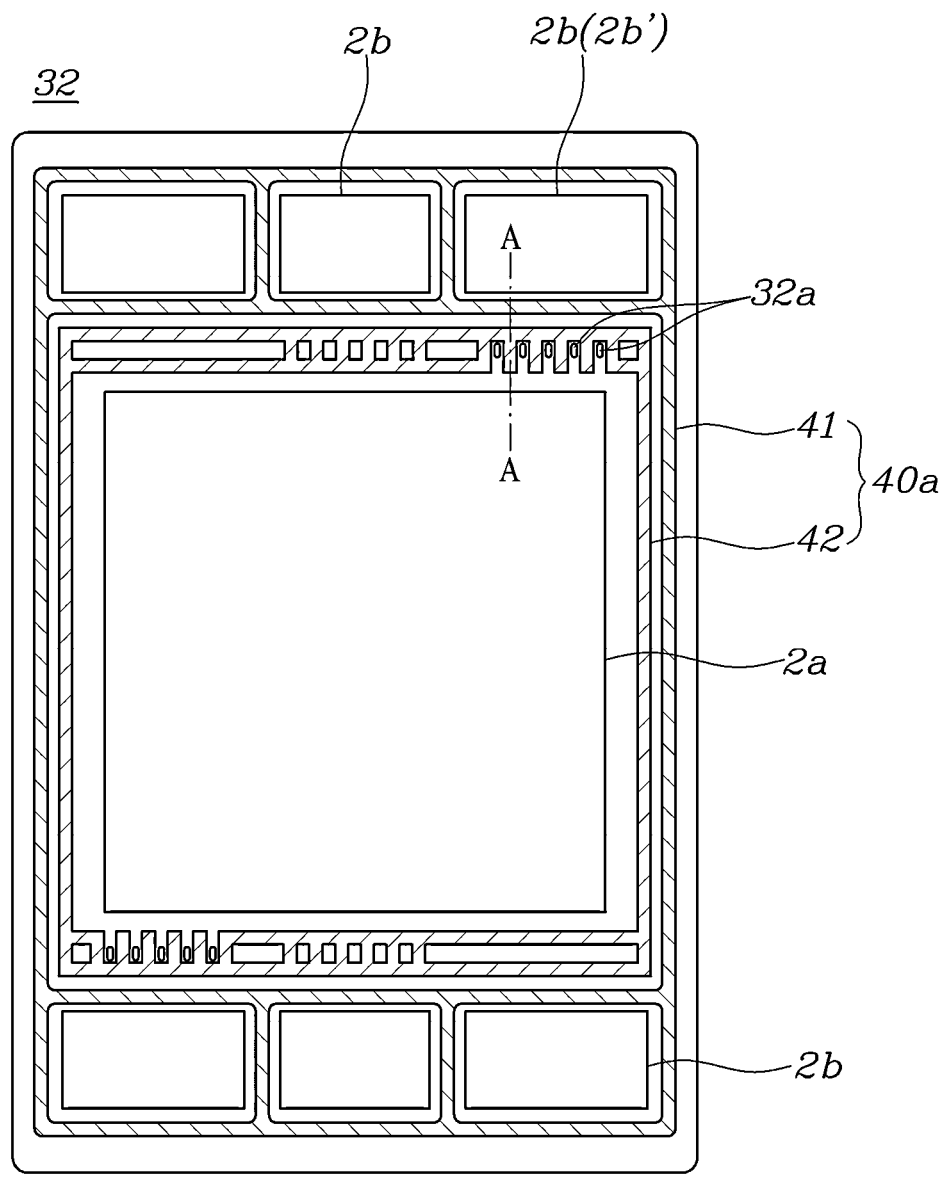
FIG. 2B is a view showing a cathode reaction surface of a cathode separator of the typical fuel cell stack.
Figure 2C:
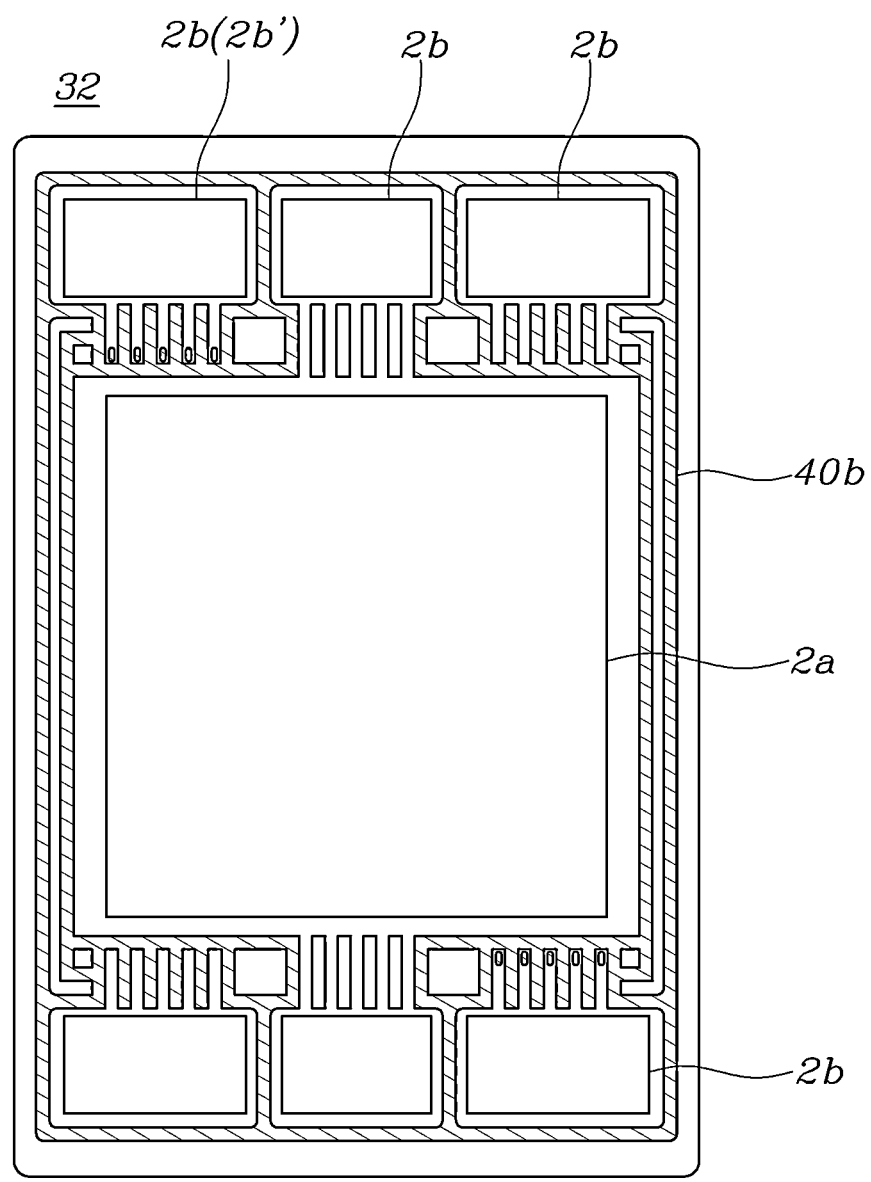
FIG. 2C is a view showing a cathode cooling surface of the cathode separator of the typical fuel cell stack.

On the cooling surface of the cathode separator 220, like on the cathode cooling surface of the cathode separator 32 shown in FIG. 2C, the cooling surface gasket 400 is formed. The cooling surface gasket 400 forms an airtight line in contact with the anode separator 210 while securing a path through which cooling water flows and a path through which air flows. Here, the cooling surface gasket 400 maintains an airtight line formed in the cathode separator in its pattern and shape.

Meanwhile, the reaction surface gasket 300 is a gasket that wraps and fixes the upper and lower ends of the sub gasket 120 while clamping the sub gasket 120 in the form of a clip on the side of the electricity-generating assembly 100, i.e., at the side of the sub gasket 120. The reaction surface gasket 300 forms an airtight line with the anode separator 210.

To this end, the reaction surface gasket 300 is divided into: an adhesive portion 310 provided by being adhered to the reaction surface of the cathode separator 220; a hinge portion 320 extended in the direction protruding from the adhesive portion 310; and a close contact portion 330 bent and extended from the end of the hinge portion 320. The reaction surface gasket 300 is in close contact with the reaction surface of the anode separator 210.

In particular, an insertion space 321 is formed in the reaction surface gasket 300 by being surrounded by the adhesive portion 310, the hinge portion 320, and the close contact portion 330. The side of the sub gasket 120 is inserted into the insertion space 321. Thus, the cross-section of the reaction surface gasket 300 is made in the form of a clip having an approximately "E" shape.

Meanwhile, in the close contact portion 330, at least one sealing protrusion 331 is formed, which protrudes in the opposite direction to the direction in which the hinge portion 320 is formed, i.e., in the direction of the anode separator 210 of the unit cell together. The at least one sealing protrusion 331 is in close contact with the reaction surface of the anode separator 210.

Here, it is desirable that the sealing protrusion 331 is formed at both ends of the close contact portion 330 and is in close contact with the anode separator 210 while having a uniform surface pressure by the close contact portion 330.

Also, it is desirable that the end of the close contact portion 330 is formed in the form of a fillet 332.

In particular, an exposed area in which the gas diffusion layer 130 is not disposed is created at the edge of the sub gasket 120. Because the fillet 332 structure is formed at the end of the close contact portion 330, the close contact portion 330 is aligned while surrounding the exposed area of the sub gasket 120.

Similar to the close contact portion 330, the adhesive portion 310 also is aligned while surrounding the exposed area of the sub gasket 120.

Meanwhile, as shown in FIGS. 7A and 7B, the reaction surface gasket 300 is formed of an elastic rubber material. Thus, while the membrane electrode assembly 110, the sub gaskets 120, the pair of gas diffusion layers 130, the anode separator 210, and the cathode separator 220 are fastened, the hinge portion 320 is elastically deformed and the sub gasket 120 is clamped and fixed by the adhesive portion 310 and the close contact portion 330.

Here, it is desirable that the height of the hinge portion 320 is elastically deformed corresponding to the height at which the membrane electrode assembly 110 and the sub gasket 120 are stacked.

Therefore, airtightness is maintained between the anode separator 210 and the membrane electrode assembly 110 by the close contact portion 330 of the reaction surface gasket 300. Airtightness is also maintained between the cathode separator 220 and the membrane electrode assembly 110 by the adhesive portion 310 of the reaction surface gasket 300. Airtightness is further maintained between the anode separator 210 and the cathode separator 220 by the adhesive portion 310, the hinge portion 320, and the close contact portion 330 of the reaction surface gasket 300.

Since it is possible to maintain airtightness between the anode separator 210 and the membrane electrode assembly 110, airtightness between the cathode separator 220 and the membrane electrode assembly 110, and airtightness between the anode separator 210 and the cathode separator 220 by the reaction surface gasket 300 formed by being injected into the cathode separator 220, there is no need to form a separate means for maintaining airtightness in the anode separator 210 of the unit cell for a fuel cell according to the present disclosure.

Therefore, a gasket for airtightness is not formed on the reaction surface and the cooling surface of the anode separator 210.

Although the present disclosure has been described with reference to the accompanying drawings and the foregoing embodiments, the present disclosure is not limited thereto but is defined by the claims set forth below. Therefore, those having ordinary skill in the art can variously change and modify the present disclosure without departing from the technical spirit of the present inventive concept provided by the following claims.

What is claimed is:

1. A separator unit used in a unit cell of a fuel cell, the separator unit comprising:
   a first separator having a reaction surface on which an electricity-generating assembly (EGA) is disposed and in which a gas diffusion layer (GDL) is laminated on each of both sides of a membrane electrode assembly (MEA), the reaction surface formed on a first side of the first separator and a cooling surface formed on a second side of the first separator; and
   a reaction surface gasket formed on the reaction surface of the first separator, wrapping and fixing a top and bottom of the EGA at a side of the EGA, and forming an airtight line with a second separator of the unit cell,
   wherein the reaction surface gasket is divided into:
      an adhesive portion provided by being adhered to the reaction surface of the first separator;
      a hinge portion extended in a direction protruding from the adhesive portion; and
      a close contact portion bent and extended from an end of the hinge portion,
   wherein an insertion space is formed by the reaction surface gasket in which the side of the EGA is inserted by being surrounded by the adhesive portion, the hinge portion, and the close contact portion.

2. The separator unit claim 1, wherein at least one sealing protrusion is formed on the close contact portion, protruding in a direction opposite to the direction in which the hinge portion is formed.

3. The separator unit claim 1, wherein the end of the close contact portion is in a form of a fillet.

4. The separator unit claim 1, wherein the reaction surface gasket is formed of an elastic rubber material.

5. The separator unit claim 1, further comprising:
   a cooling surface gasket formed on the cooling surface of the first separator, the cooling surface gasket forming an airtight line with a second separator of another unit cell disposed adjacent to the unit cell.

6. The separator unit claim 1, wherein the EGA further comprises a sub gasket that surrounds and supports an edge of the MEA, and
   wherein the reaction surface gasket wraps and fixes the top and bottom of the sub gasket.

7. A unit cell for a fuel cell, the unit cell comprising:
an electricity-generating assembly (EGA) in which a gas diffusion layer (GDL) is laminated on each of both sides of a membrane electrode assembly (MEA);
a first separator and a second separator disposed on an outside of the EGA, wherein a reaction surface through which a reactive gas flows is formed on a surface of each of the first separator and the second separator, facing the GDL, and wherein a cooling surface through which cooling water flows is formed on a surface, of each of the first separator and the second separator, opposite to the surface facing the GDL;
a reaction surface gasket formed on the reaction surface of the first separator, wrapping and fixing a top and bottom of the EGA at a side of the EGA, the reaction surface gasket forming an airtight line with the second separator; and
a cooling surface gasket formed on the cooling surface of the first separator, the cooling surface gasket forming an airtight line with a second separator of another unit cell disposed adjacent to the unit cell.

8. The unit cell of claim 7, wherein the reaction surface gasket is divided into:
an adhesive portion provided by being adhered to the reaction surface of the first separator;
a hinge portion extended in a direction protruding from the adhesive portion; and
a close contact portion bent and extended from an end of the hinge portion, and is in close contact with the reaction surface of the second separator,
wherein an insertion space is formed by the reaction surface gasket and in which the side of the EGA is inserted by being surrounded by the adhesive portion, the hinge portion, and the close contact portion.

9. The unit cell of claim 8, wherein at least one sealing protrusion is formed on the close contact portion, protruding in a direction opposite to the direction in which the hinge portion is formed, and is in close contact with the reaction surface of the second separator.

10. The unit cell of claim 8, wherein the end of the close contact portion is in a form of a fillet.

11. The unit cell of claim 10, wherein an exposed area in which the GDL is not disposed is formed at an edge of the EGA, and
wherein the adhesive portion and the close contact portion surround the exposed area of the EGA.

12. The unit cell of claim 8, wherein the EGA further comprises a sub gasket that surrounds and supports an edge of the MEA, and
wherein the reaction surface gasket wraps and fixes the top and bottom of the sub gasket.

13. The unit cell of claim 12, wherein, when the EGA and the second separator and the first separator are fastened, a height of the hinge portion corresponds to a stacked height of the MEA and the sub gasket.

14. The unit cell of claim 12, wherein, when the EGA and the second separator and the first separator are fastened, the reaction surface gasket is formed of an elastic rubber material, and
wherein, as the hinge portion is elastically deformed, the sub gasket is clamped by the adhesive portion and the close contact portion.

15. The unit cell of claim 7, wherein a gasket for airtightness is not formed on the reaction surface and the cooling surface of the second separator.

16. The unit cell of claim 7, wherein the first separator is a cathode separator and the second separator is an anode separator.

* * * * *